United States Patent [19]
Deitesfeld

[11] Patent Number: 4,560,307
[45] Date of Patent: Dec. 24, 1985

[54] INSULATION BLOWER

[75] Inventor: Rex R. Deitesfeld, Broomfield, Colo.

[73] Assignee: Insulation Technology Corporation, Westminster, Colo.

[21] Appl. No.: 683,340

[22] Filed: Dec. 20, 1984

Related U.S. Application Data

[63] Continuation of Ser. No. 407,041, Aug. 11, 1982, abandoned.

[51] Int. Cl.[4] ............................................. B65G 53/46
[52] U.S. Cl. ...................................... 406/63; 222/236;
222/317; 222/368; 406/67; 406/135
[58] Field of Search ................................... 406/62–68,
406/135; 222/236, 317, 368

[56] References Cited

U.S. PATENT DOCUMENTS

| | | | |
|---|---|---|---|
| 817,727 | 4/1906 | Sletto | 222/236 |
| 1,110,935 | 9/1914 | Heylman | 222/236 |
| 1,309,059 | 7/1919 | Bacon | 222/368 |
| 1,583,539 | 5/1926 | Ershler | 222/236 X |
| 2,530,181 | 11/1950 | Schilling | 222/236 X |
| 3,009,744 | 11/1961 | Lenhart | 406/67 |
| 3,529,870 | 9/1970 | Woten | 406/135 X |
| 3,995,775 | 12/1976 | Birkmeier et al. | 406/135 X |

FOREIGN PATENT DOCUMENTS

| | | | |
|---|---|---|---|
| 2450245 | 5/1976 | Fed. Rep. of Germany | 406/66 |
| 1015949 | 10/1952 | France | 406/135 |
| 267492 | 9/1929 | Italy | 222/236 |
| 282039 | 7/1952 | Switzerland | 222/236 |

Primary Examiner—Jeffrey V. Nase
Attorney, Agent, or Firm—H. B. Van Valkenburgh; J. W. Berkstresser

[57] ABSTRACT

A hopper cylindrical about a vertical axis has an agitator with blades rotating near the bottom of the hopper, not only to agitate insulation but also to move it through a hopper outlet opening into an airlock having a horizontal shaft and radially spaced blades. The vertical shaft for the hopper agitator and the horizontal airlock shaft are aligned so that one may be driven from the other, as by miter gears. A motor and reduction gearing may drive the airlock shaft, through a chain and sprocket connection, or the motor and reduction gearing may drive the hopper agitator shaft through a coupling. The blades of the airlock rotor may be individually removable through the airlock inlet, as in order to replace flexible wipers. Each airlock blade may have a flange at an obtuse angle such as 150° which is bolted to one side of the multisided shaft by a series of cap bolts. Preferably, the number of blades is even, so that the shaft has a corresponding number of sides and tapped holes for the cap bolts that extend completely through the shaft, to the opposite side and cap bolts for opposed blades enter opposite ends of the holes. For other blades, the holes are spaced longitudinally, so that no holes will intersect. The bottom of the hopper may be a relatively thick, circular plate to which the equipment in a circular, base enclosure may be attached. Other features are also disclosed.

19 Claims, 12 Drawing Figures

INSULATION BLOWER

This application is a continuation of Ser. No. 407,041 filed Aug. 11, 1982, now abandoned.

This invention relates to insulation blowers.

BACKGROUND OF THE INVENTION

Numerous and varied types of insulation blowers have been produced, for use in blowing insulation, such as fiberglass, rockwool and the like, into a space to be insulated, through a hose connected with the blower. Some blowers operate essentially on the pump principle, i.e. the insulation itself passes through the blower, which is usually of the centripetal type. Other blowers utilize an airlock, in which insulation is fed into successive spaces between planar blades mounted in radial positions on a shaft, normally rotated about a horizontal axis. The blades are provided with some type of seal for engaging a generally cylindrical housing closed at each end but having a top opening for introducing the insulation. The insulation is fed from a hopper into the top opening of the airlock and, as the shaft and blades rotate, is carried around within the successive spaces between blades, so as to be contained within an otherwise generally closed space at the bottom or toward one side of the bottom of the cylindrical housing. An inlet for air is provided at one end of such a position and an opposite outlet for insulation forced by air pressure through the space between the blades and into a hose. A blower provides air pressure to the inlet for the space from which the insulation is expelled into the hose. Such a hose may lead to the space, as within a wall, above a ceiling or beneath a floor, into which the insulation is to be blown.

Generally, insulation is placed in a hopper above the airlock, while insulation in the hopper is agitated by agitating rods mounted on a horizontal shaft. Such rods may also be formed as paddles for moving the insulation toward an outlet of the hopper, which normally coincides with the inlet of the airlock. Such an insulation agitator shaft requires a horizontally disposed, semi-cylindrical bottom for the hopper, which in turn has dictated a square or rectangular lower housing for the unit with considerable waste space around the outside of the semi-cylindrical bottom of the hopper and thereby a reduction in the volume of insulation which may be placed in the hopper. As a consequence, additional material is required for constructing a hopper having the desired volume, as well as complicating the problem of adequately attaching the base to the hopper. Since the agitator shaft, within the hopper, is rotated about a horizontal axis and the airlock shaft is also rotated about a horizontal axis, the drive arrangement, from a motor, for such a construction may often be complicated and expensive. A motor drive for the airlock may be placed beneath the hopper, but the drive to the horizontal hopper stirring shaft may require placement outside the hopper and thus require protection in that position. Sometimes, a separate space within the unit is provided in order to contain the drive to the hopper agitator shaft. In some instances, separate motors are utilized to drive the airlock shaft and the hopper agitator shaft, as when the two shafts are driven at different speeds. Whether one or two motors, each such motor is ordinarily provided with reduction gearing, since the speed of rotation of electric motors which are manufactured in sufficient quantities to be economical, is normally considerably greater than the speed at which the airlock shaft and/or the stirrer shaft are desired to be driven.

Certain problems also arise in the construction of the blades of the airlock rotor. Sometimes these blades are attached individually to the airlock shaft, but require disassembly of the airlock and removal of the rotor for repair or replacement of one or more blades. In U.S. Pat. No. 3,708,890, a rectangular shaft for a rotary airlock is provided with two pairs of V-shaped blade holders attached by bolts to the opposite sides of a rectangular shaft, so that four blades may be attached, at 90° apart, to the respective extending arms of the holders. However, the assembly of two blades to a holder does not permit the two blades to removed, as a unit, from the airlock through the inlet opening. Thus, either the airlock must be disassembled for repair, or an individual blade disassembled inside the airlock, which is a time consuming task due to the position of the bolts which attach the blades to the blade holders, since access to the opposite sides of a blade holder is necessary.

Among the objects of this invention are to provide a novel blower for blowing insulation; to provide such a blower which is readily portable; to provide such a blower having a hopper in which a shaft for rotating agitator blades is upright and extends generally centrally for only a short distance into the hopper; to provide such an insulation blower in which both a shaft for the agitator blades in the hopper and the airlock shaft may be driven from the same motor, as through a simple drive connection; to provide such an insulation blower in which the vertical position of the hopper agitator shaft and the horizontal position of the airlock shaft permits one shaft to be driven from the other, through a simple bevel or miter gear connection; to provide such an insulation blower in which either the airlock shaft or the hopper agitator shaft may be driven directly by reduction gearing and the other from the direct driven shaft, thereby requiring only a single motor; to provide such an insulation blower in which the speed ratio between the airlock shaft and the hopper agitator shaft may be varied; to provide such an insulation blower having an upright, cylindrical hopper, thereby minimizing the amount of material required, due to the inherent volumetric capacity of such a hopper; to provide such an insulation blower in which the hopper may be generally cylindrical and thereby be provided with an essentially flat bottom around which the blades of the agitator rotate; to provide such an insulation blower in which the agitator blades may move the insulation in the hopper into an opening, from a direction opposite the direction of rotation of the airlock rotor; to provide such an insulation blower in which the blades of the rotor are attached to the rotor shaft in a novel manner; to provide such an insulation blower in which the blades of the airlock rotor are attached to the shaft in a manner which permits any blade to be removed individually by removing only a few bolts which are readily accessible for such removal; to provide such an insulation blower which may be optionally controlled from a remote location and the amount of insulation delivered may also be controlled; to provide such an insulation blower which may be manufactured in a simple and inexpensive manner; and to provide such an insulation blower which will operate effectively and efficiently.

SUMMARY OF THE INVENTION

In an insulation blower, an upper hopper is cylindrical about a vertical axis, not only to increase the volumetric capacity of the hopper but also so that an upright shaft may rotate agitating arms mounted radially thereon, which move insulation through an opening into an airlock below. The shaft of the airlock rotor rotates on a horizontal axis and one of the agitator shaft and airlock rotor shaft are in alignment with the other, to enable one to drive the other through meshing bevel or miter gears, which may also produce a variation in the speed of the shafts, such as a higher speed for the hopper agitator shaft. A single motor, through a gear reduction unit, is sufficient for driving both shafts. When the horizontal airlock rotor shaft is driven from the gear reduction unit, a horizontal shaft extending therefrom is coupled to the airlock rotor shaft by a chain and sprocket connection. When the upright hopper agitator shaft is driven by the gear reduction unit, an output shaft may extend upwardly therefrom for coupling to the lower end of the hopper agitator shaft, with the miter gears for driving the horizontal airlock rotor shaft above the coupling.

The hopper agitator comprises a series of arms extending radially from a hub on the upper end of the upright shaft which are conveniently rotated to travel in a direction opposite to the direction of rotation of the airlock blades beneath the opening, so that the insulation pushed through the opening by the agitator blades will be pushed into successive spaces between adjacent pairs of airlock blades as they start downwarldy. Also, a slide gate may extend through a slot in the lower end of the side wall of the hopper above the opening to the airlock for adjustment to regulate the amount of insulation moving from the hopper through the opening into the airlock. The airlock and a motor driven blower may be suspended from a horizontal partition between the hopper and the lower enclosure space, while the outlet of the blower is duct connected to an inner end plate of the airlock, at a lower position generally opposite the airlock opening through which insulation moves. The outlet of the airlock, generally opposite the inlet, extends from an outer end plate of the airlock through an annular wall of the lower enclosure, while the airlock inlet and the blower connection are laterally offset from the vertical center of the airlock shaft. The lower enclosure is essentially a downward extension of the hopper and readily contains the necessary operating parts. These parts are easily reached for repair or replacement, particularly the rotor blades when the preferred construction is utilized.

The airlock rotor shaft is hexagonal and provided with a series of tapped holes extending between opposed sides, with the holes in adjacent sides being spaced apart so as to avoid intersection, although each end of the airlock shaft may be provided with a cylindrical section for bearing purposes and the attachment of a miter gear or sprocket. Each airlock rotor blade is provided with a mounting flange at 150° to the blade, which is attached by a series of cap bolts in the tapped holes in the corresponding side of the hexagonal shaft. The angularity between the flange and the blade permits ready access to the cap bolts for removal of a single blade through the inlet opening, thereby avoiding any necessity for disassembly of the airlock for repair or replacement of a blade. Each blade is conventionally provided with a sealing strip, extending axially beyond each end and circumferentially beyond the outer edge of the blade.

DESCRIPTION OF THE PREFERRED EMBODIMENT

The insulation blower illustrated in FIGS. 1–7, which is constructed in accordance with this invention, has a medium capacity, is adapted to be remotely controlled and includes an upright, cylindrical hopper H having an open top, into which a supply of insulation may be poured. The insulation in the hopper may be agitated by an agitator A of FIG. 2, which is driven from a motor M of FIG. 3, through a gear reduction unit G, with the motor and associated parts being contained within a base enclosure E into which a control panel C extends laterally. The motor M also drives an air lock L, to which air is supplied by a blower B, with the insulation being moved around within the air lock L by a rotor R of FIG. 5 for discharge through an outlet 9 by air supplied opposite the outlet. A conventional hose (not shown) is connected to the outlet 9 and leads to the space into which the insulation is to be blown.

The hopper H is provided with an upper side wall 10, as of plastic which may diverge slightly outwardly and downwardly to a heavier or thicker side wall 11, as of plastic, surrounding the area in which the agitator A rotates. A partition 12 may form both a bottom for hopper H and a top for the base enclosure E, or the bottom of the hopper may be separate from the base enclosure E, as described later in connection with FIG. 7. A slot 13 in side wall 11 accommodates a slide 14 having an outer flange 15 for adjustment to desired positions, for controlling the amount of insulation flowing into the air lock, while the fit between slot 13 and slide 14 is preferably such that slide 14 will be maintained in any adjusted position. A rectangular opening 17 of FIG. 2 in partition 12, at a position located below slide 14 and centrally above the air lock L, as in FIGS.

4 and 6, permits flow of insulation from the hopper into the air lock. Slide 14 and its inner edge 16 are disposed between the agitator A and the hopper bottom 12, as in FIGS. 4 and 6, while opening 17 has an inner edge 18 and outer edge 19. Slide 14 may be placed in accordance with the type of material being blown and the rate at which it is to be discharged through the outlet 9.

Figure 4:
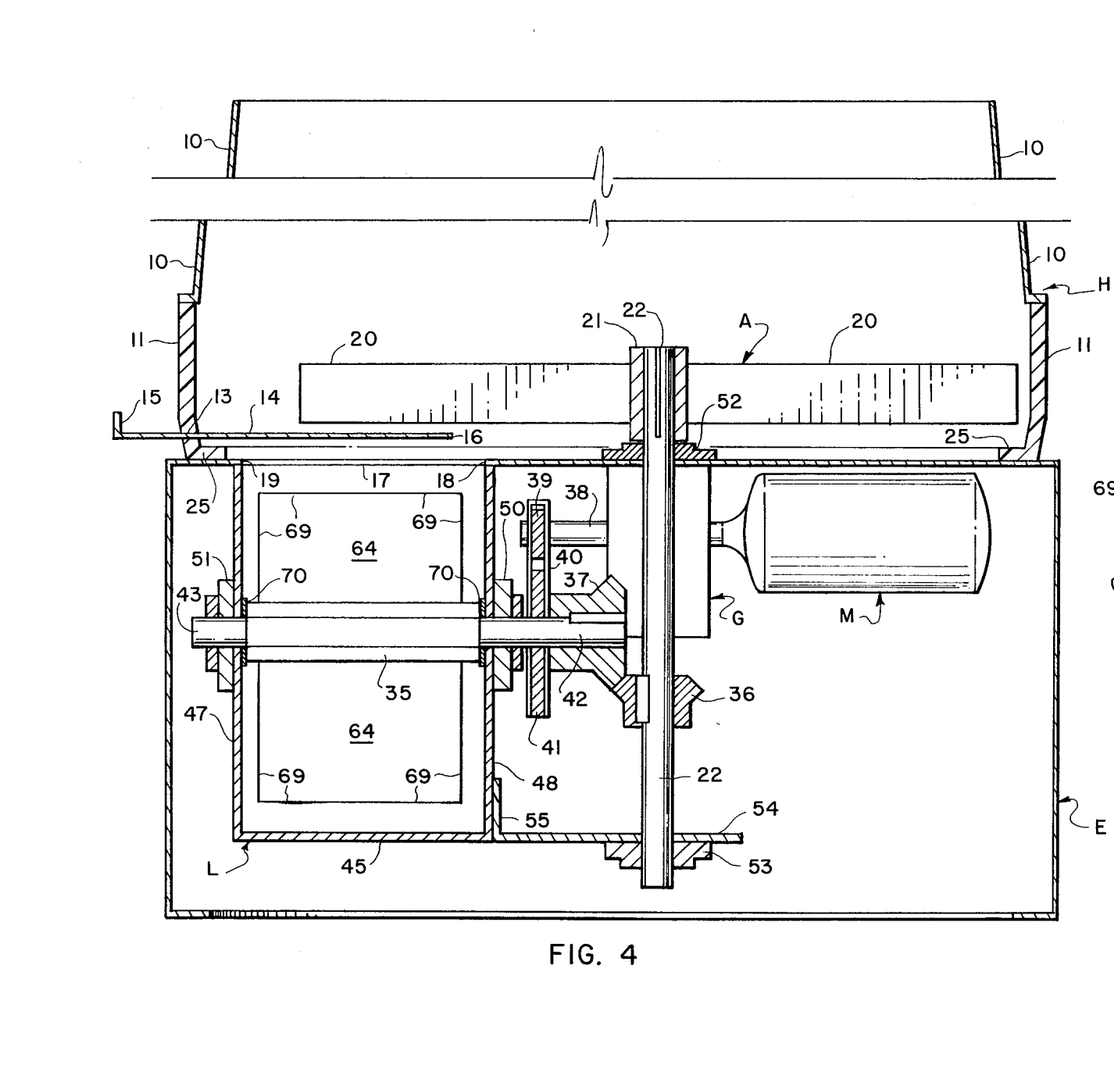
FIG. 4 is a vertical section, on a further enlarged scale, taken along line 4—4 of FIG. 3.

The agitator A includes a series of blades 20, extending radially from and attached to a hub 21, in turn keyed to an upright shaft 22, which extends downwardly through partition 12 and rotates about an axis slightly off center, in order to accommodate the drive mechanism described later in greater detail but includes motor M and gear reduction unit G. The path of the agitator blades 20 thus may approach closer to the opposite side of the hopper bottom than the side adjacent air lock opening 17. However, this insures that insulation remote from the air lock will be swept around to a position in which it will readily fall through the opening 17 and into the air lock. With the slide 14 nearly closed, as shown in FIG. 4, for purposes of illustration, the insulation swept into the air lock will be moved by portions of blades 20 closer to the shaft 22, while when the slide 14 is opened further, i.e. moved to positions further outwardly from the inner edge 18 of the slot 17, as in FIG. 2, the blades 20 will still pass over the opening 17 on each rotation of the agitator A, thereby insuring adequate flow of insulation into the air lock. When slide 14 is fully opened, i.e. when the position of inner edge 16 thereof coincides with the outer edge 19 of the air lock opening 17, insulation will fall through a small portion of the space within the hopper beyond the movement of the ends of the agitator blades 20, but such a complete opening will normally be utilized with lighter or fluffier material, larger volumes of which are more readily moved and blown.

Figures 6, 7:
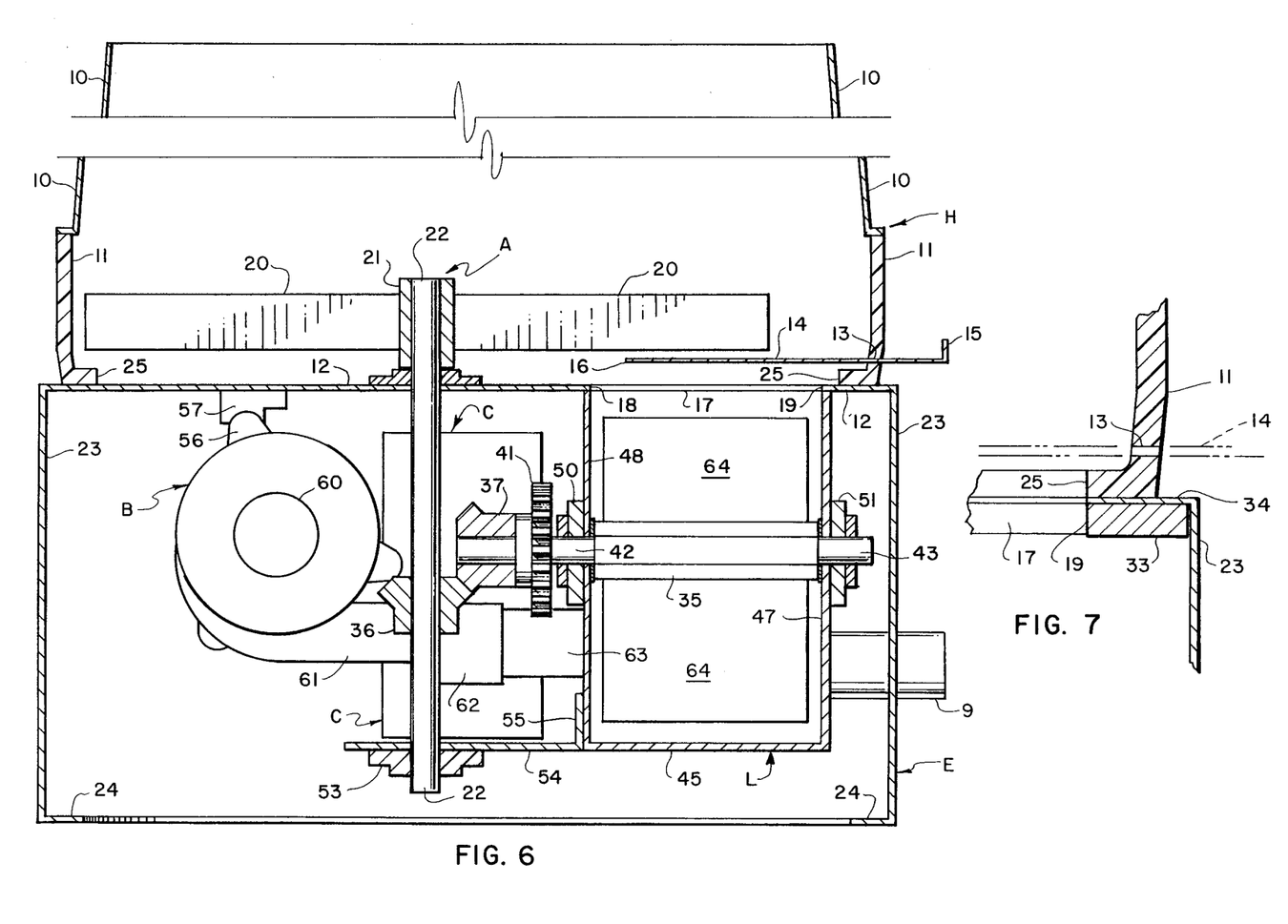
FIG. 6 is a vertical section, on a slightly enlarged scale, taken along line 6—6 of FIG. 3 in a direction opposite to FIG. 4.
FIG. 7 is a further enlarged, fragmentary detail of the intersection between an upper hopper and a lower housing, at the outer end of a feed opening for the air lock.

The base enclosure E is provided with a side wall 23, through which the outlet 9 and also the control panel C extends. Side wall 23 may be provided with an inwardly extending, bottom flange 24 which provides stability, reinforces the side wall and permits a lesser thickness of material, such as sheet metal, to be used, while lower hopper side wall 11 may be provided with an inwardly extending bottom flange 25 for attachment to partition 12. A remote control cord 26 of FIG. 1 may be extended from the control panel C to the point of use of the customary blowing nozzle mounted on the conventional hose attached to the outlet 9, while cord 26, if desired, may be attached to the hose, although it may merely extend along with it. Control panel C is further provided with a blower control switch 27, which is used to turn the electric motor of blower B of FIG. 2 on or off, and an agitator and airlock switch 28, which is utilized to turn motor M on and off. A blower override control 29 and an agitator override control 30 may be used to permit control of the blower and agitator through the controls at the outer end of cord 26. A fuse or relay reset button 31 is utilized for obvious purposes, while electrical power for the motor of blower B may be supplied through a connection 32 and electrical power for the motor M, which drives both the agitator A and airlock rotor R, may be supplied through a connection 32'. Upper side wall 10 and lower side wall 11 of the hopper H are conveniently formed of molded plastic, while the partition 12 may be formed of metal, since the parts within the base enclosure E are generally suspended from the underside of partition 12. As shown in FIGS. 4 and 6, partition 12 may be formed integrally with or welded to side wall 23 of base enclosure E and may also provide a bottom for hopper H. However, the alternate construction of FIG. 7 may be found more desirable, in which a thicker circular plate 33 forms the bottom of hopper H and also the top of base enclosure E, with a top flange 34 extending inwardly from lower side wall 23 between plate 33 and lower flange 25 of side wall 11 of hopper H. As shown, an opening 17, above the airlock L, is formed in plate 33.

In accordance with this invention, one of agitator shaft 22 and an airlock rotor shaft 35 are aligned axially with the other, so that rotation from one to the other may be produced by interfitting miter gears 36 and 37, the former mounted on agitator shaft 22 and the latter on airlock rotor shaft 35. Miter gears 36 and 37 may have the same number of teeth, so that both shafts will be driven at the same r.p.m., although the number of teeth preferably differ, as shown, so that a difference in speed between the two shafts may be obtained, with agitator shaft 22 being driven at a higher speed than airlock rotor shaft 35. Airlock rotor shaft 35 may be driven from motor M, through reduction gearing G, as in the embodiment illustrated in FIGS. 1–7, or agitator shaft 22' may be driven from motor M', through reduction gearing G', as in the embodiment of FIGS. 8–12. Thus, gear box G is driven directly from the motor M, as in FIGS. 3 and 4, and is provided with a reduced speed output shaft 38 on which a sprocket 39 is mounted, for driving a chain 40 which extends to a sprocket 41, which is mounted on and, through the chain, drives directly airlock rotor shaft 35. Shaft 35 is hexagonal within the airlock itself, but sprocket 41 is mounted on a circular portion 42 thereof and shaft 35 also has a circular portion 43 at the opposite end. Miter gear 37 is also mounted on circular portion 42 of the airlock shaft. The offset position of shaft 22 accommodates the space required by sprocket 41 on the rotor shaft. As will be evident, the airlock rotor shaft 35 may be driven at a speed reduced considerably from that of motor M through the reduction gearing G, with an increase in speed of shaft 22 being produced by a decrease in pitch diameter from gear 37 to gear 36.

Figure 5:
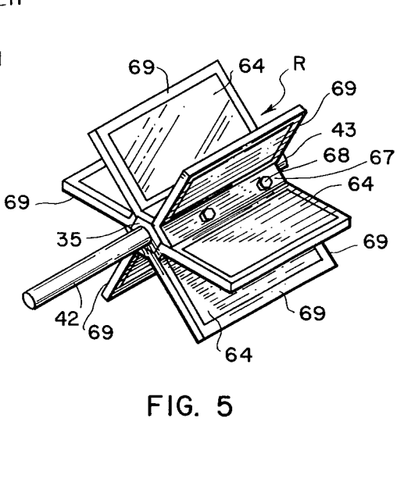
FIG. 5 is a perspective view of a rotor for an air lock of the insulation blower.

The airlock L may include a housing enclosing rotor R of FIG. 5, with a central plate 45 of the housing being cylindrical up to the center of the rotor, then extending vertically to the underside of the partition 12. Plate 45 has a lateral flange 46, at each side as in FIG. 3, for attachment to the underside of partition 12. As in FIGS. 4 and 6, the airlock may be closed by an outlet end plate 47 and an intake end plate 48, each of which corresponds in peripheral shape to the corresponding edge of the central plate 45. The airlock rotor shaft 35 is supported by a bearing 50, mounted on the intake end plate 48 and engaging the cylindrical shaft portion 42, and by a bearing 51 mounted on the outlet end plate 47 and engaging the cylindrical shaft portion 43. The agitator shaft 22 is supported between an upper bearing 52, which surrounds the shaft above and is mounted on partition 12, and a combined rotation and thrust bearing 53 mounted on the underside of a bracket 54, which extends laterally from and is attached to the intake end plate 48 of the airlock, as by a flange 55. Blower B may be provided with a mounting ear 56, as in FIG. 6, for removable attachment to a bracket 57, mounted on the underside of partition 12, while gear box G may be provided with a mounting ear at each corner, such as ears 58 of FIG. 3, again for attachment to the underside of partition 12. It will be understood that when the alternative, thicker circular plate 34 of FIG. 7 is utilized, the blower B and airlock L will be suspended from the underside of this plate.

Figure 1:
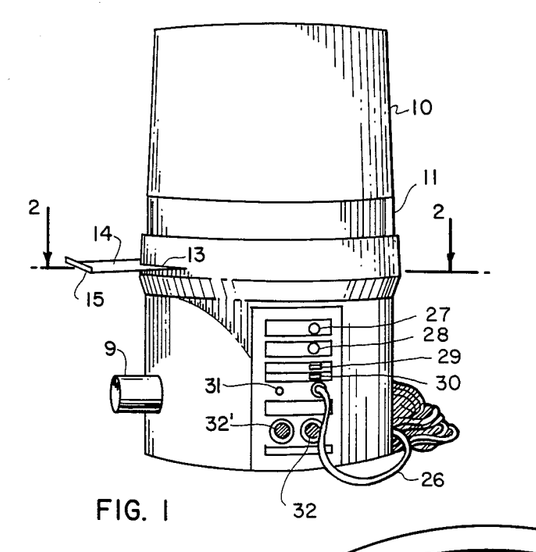
FIG. 1 is a perspective view of an insulation blower constructed in accordance with this invention.
Figure 2:
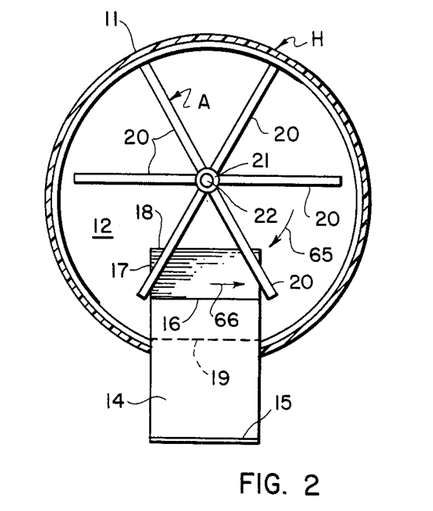
FIG. 2 is a cross section, on a slightly enlarged scale, taken along line 2—2 of FIG. 1.
Figure 3:
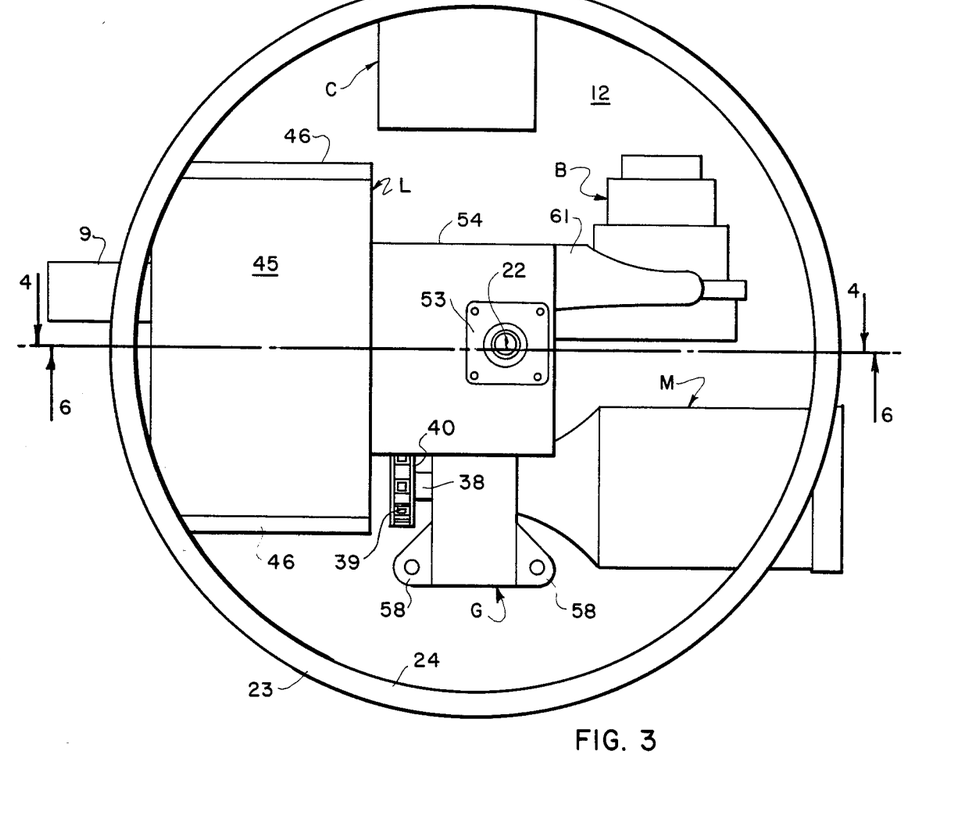
FIG. 3 is a bottom plan view, on an enlarged scale, of the insulation blower of FIG. 1, with a bottom plate removed.

Blower B, as in FIGS. 3 and 6, may be provided with an intake 60 and an outlet 61 which is connected by a coupling tube 62 with an inlet tube 63 of the airlock L. Conventionally, the inlet tube 63 of the airlock L is in longitudinal alignment with the outlet 9, so that the insulation between two adjacent blades 64 of the airlock rotor R of FIG. 5, will be propelled into and through the outlet 9 as the airlock rotor rotates. As shown in FIG. 3, the lateral position of both outlet 61 of blower B and airlock outlet 9 is offset from the vertical center line of shaft 42 of airlock L, to accommodate agitator shaft 22 of FIGS. 3 and 4, the axis of which intersects the axis of airlock shaft 42. Preferably, the direction of rotation of the agitator A, such as indicated by an arrow 65 of FIG. 2, is opposite to the direction of rotation of the airlock rotor, as indicated by an arrow 66, so that as insulation is swept into the opening 17, as by the agitator blades, it will fall directly into spaces between adjacent pairs of downwardly moving blades 64 of the airlock rotor R. As in FIG. 5, each blade 64 may be provided with a flange 67 which extends at 120° to blade 64, for a purpose described later, and is attached to the corresponding hexagonal side of the airlock rotor shaft 36 by cap bolts 68. Each blade may be provided with a sealing strip 69, which extends both laterally and longitudinally beyond the corresponding sides and ends of blade 64, so as to wipe the adjacent surfaces of the central plate 45 and the end plates 47 and 48, thereby sealing the space between two blades. Air is supplied to these spaces, in turn, by airlock inlet 63 of FIG. 6, and blows the insulation in each such space, in turn, through outlet 9, since each space between a pair of blades, by the time it reaches inlet 64 and outlet 9, is sealed within the semicylindrical portion of center plate 45 and the end plates 47 and 48. Each end of the hexagonal portion of shaft 35 abuts a seal ring 70, to prevent leakage of air around the shaft. In the alternative construction of the connection between lower wall 11 of the hopper with the side wall 23 of the base enclosure, illustrated on an enlarged scale in FIG. 7, inwardly extending flange 25 of the lower side wall 11 abuts flange 34 of side wall 23, permitting attachment of the hopper to the base enclosure, as by bolts in molded countersunk holes in hopper wall flange 25 and extending through flange 34 and relatively thick plate 33.

As will be evident, the drive connection between the motor and gearing, on the one hand, and the agitator and airlock on the other hand, simplifies considerably the construction of the insulation blower. By driving the airlock rotor shaft from the gear box, with the center line of the airlock rotor shaft being in direct alignment with the agitator shaft, a simple miter or bevel gear connection may be made between the two shafts. Thus, separate power takeoffs for the agitator and the airlock become unnecessary. Such a simple drive mechanism, as compared with the bulky and cumbersome drives heretofore used, enable the entire motor, gear box and airlock assembly, along with the blower for the airlock, to be used in a space having no greater diameter than the hopper. An agitator which rotates about a vertical axis, rather than a horizontal axis, as has been heretofore customary, is more effective in sweeping insulation into a feed opening or slot for the airlock and particularly in moving insulation into the feed slot in a direction such that insulation will encounter the airlock rotor blades as the blades move downwardly, thereby insuring that each space between adjacent airlock blades is as full as possible of insulation when each space encounters the air stream which propels the insulation in the space into the outlet 9.

A somewhat simpler form of the insulation blower, also constructed in accordance with this invention, is illustrated in FIGS. 8–12. This construction eliminates the chain and sprocket connection between the gear box and either of the drive shafts, permitting one shaft to be driven directly from the gear box. Although this insulation blower is shown as omitting several of the controls of the embodiment previously described, including the slide gate 14 thereof for regulating flow of insulation into the airlock, it will be understood that such a feature may be incorporated in the embodiment of FIGS. 8–12, as well as other control features of the previous embodiment. As shown, the insulation blower of FIGS. 8–12 has a hopper H′ having a lesser capacity than hopper H and is designed for use with a specific insulation, such as rock wool, in order to reduce the cost to a minimum. As in FIG. 8, hopper H′ is provided with an agitator A′, while as in FIGS. 9 and 10, a blower B′, a motor M′, a reduction gearing unit G′ and an airlock L′, having a rotor R′ and an outlet 9′ are installed within a base enclosure E′. As in FIGS. 8 and 10, hopper H′ may include a conical side wall 75 having an inwardly curving rim 76 at the top. The exterior of the lower base enclosure E′ may be provided with a scalloped configuration formed by connected alternating scallop sections 77 and 78 of lesser and greater diameter which extend to a bottom flange 79. Hopper side wall 75 and the side wall of lower enclosure E′, including connected scallops 77 and 78 and bottom flange 79, may be formed of plastic which is molded to shape, with a convex bottom partition 80 of hopper H′ being integral with the side wall 75 and an interfitting top partition 81 of enclosure E′ being integral with the side wall thereof. A pair of angles 82 extend across bottom flange 79, as between a pair of outer scallops 78, to support motor M′ and gear box C′, while airlock L′ is supported from the underside of partitions 80 and 81 by an angular bracket whose upright end leg 83 is aligned with end wall 48′ of airlock L′ and whose upright sidelegs 84 are aligned with the sides of center plate 45′ of the airlock, thereby flanking aperture 17′ through which the insulation moves from hopper H′ into the airlock. Blower B′ may be suspended in the manner previously described.

Figure 8:
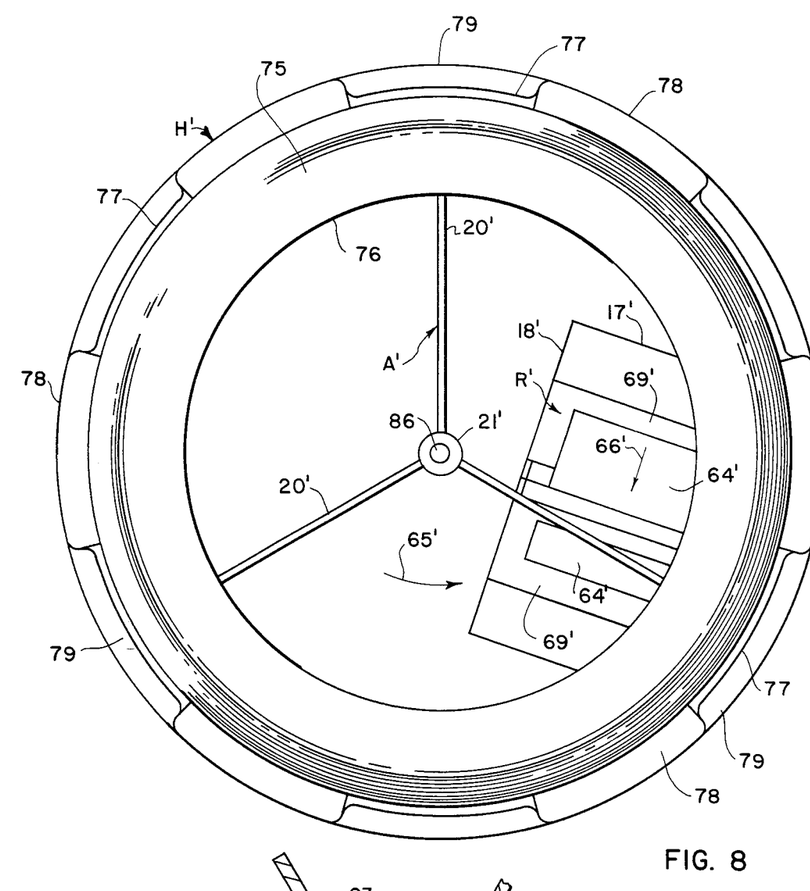
FIG. 8 is a top plan view of an alternative insulation blower constructed in accordance with this invention.
Figures 9, 10, 11:
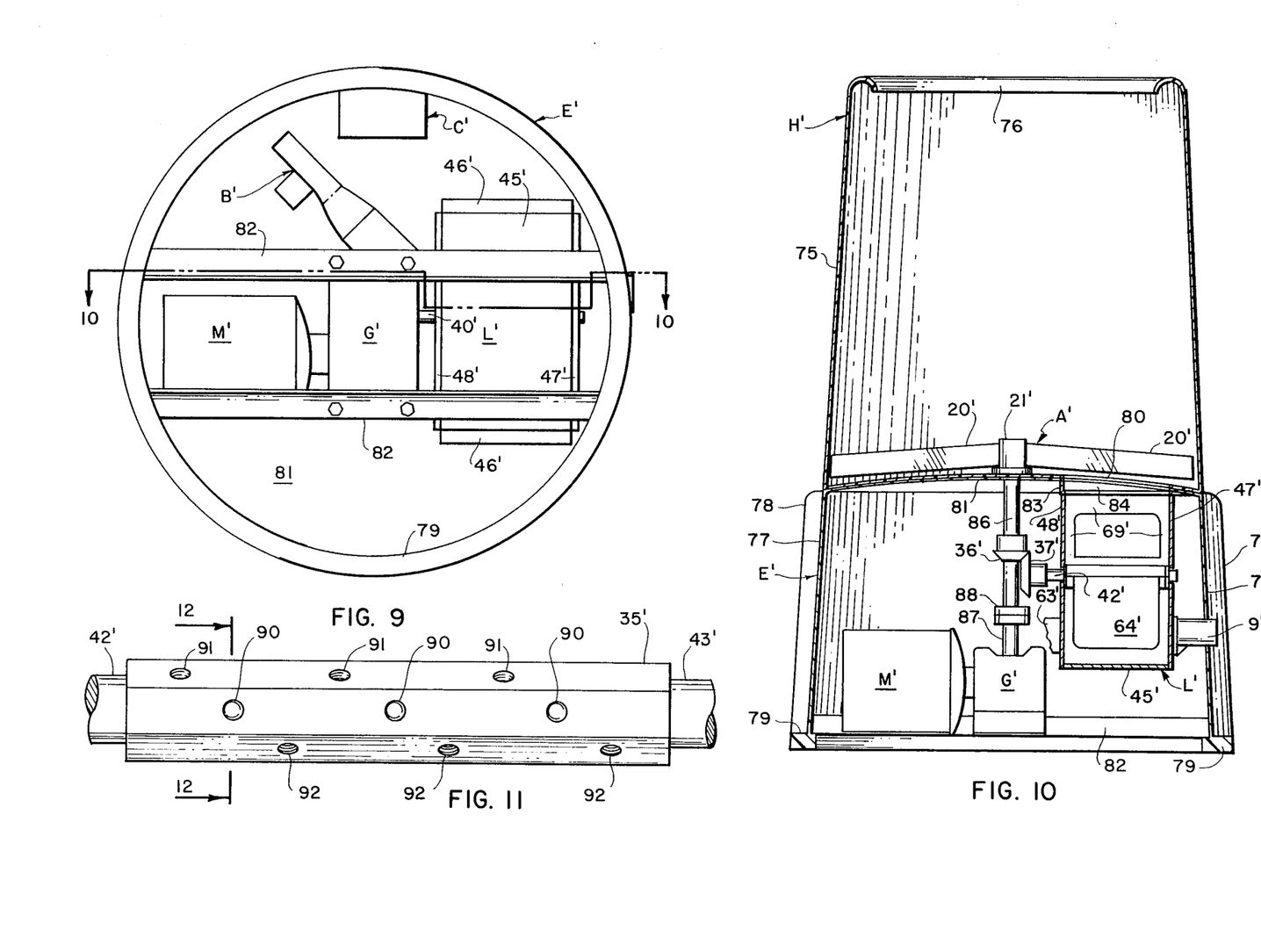
FIG. 9 is a bottom plan view of the insulation blower of FIG. 8.
FIG. 10 is an offset vertical section, taken along line 10—10 of FIG. 9, on a reduced scale.
FIG. 11 is a side elevation on a greatly enlarged scale of the central portion of a shaft for an airlock rotor.

Blades 20′ of agitator A′ of FIG. 8 are mounted on a hub 21′, in turn mounted on a vertical shaft 86, while blades 20′ are inclined outwardly and downwardly to follow the contour of hopper bottom 80, as in FIG. 9, which forms a double thickness with the correspondingly shaped top 81 of base enclosure E′. Inlet 63′ of the airlock, shown partially in FIG. 10, is connected to the outlet of blower B′, as in a manner similar to that previously described, in axial alignment with outlet 9′.

In accordance with this invention, not only is the airlock rotor shaft in alignment with the agitator shaft 86, so that a miter gear 36′ may be mounted on the agitator shaft, as in FIG. 10, for engagement with a miter gear 37′ mounted on the circular portion 42′ of the airlock shaft, but also gear box G′ is mounted below agitator shaft 86, so that a gear box drive shaft 87 may be placed in vertical alignment with agitator shaft 86 and the latter driven directly through a coupling 88. As will be evident, the speed of rotation of gear box drive shaft 87 may be proportioned to the speed at which agitator A is to be driven, while the pitch diameters or number of teeth of miter gears 36' and 37' may be proportioned so that the airlock rotor will be rotated at a different speed. As shown in FIG. 10, the pitch diameter of miter gear 36' is less than that of miter gear 37', so that the airlock rotor R' will be driven at a slightly lesser speed than the agitator A'. As before, the agitator A', as indicated by arrow 65' of FIG. 8, is rotated in the opposite direction to the airlock rotor R', as indicated by arrow 66'.

Figure 12:
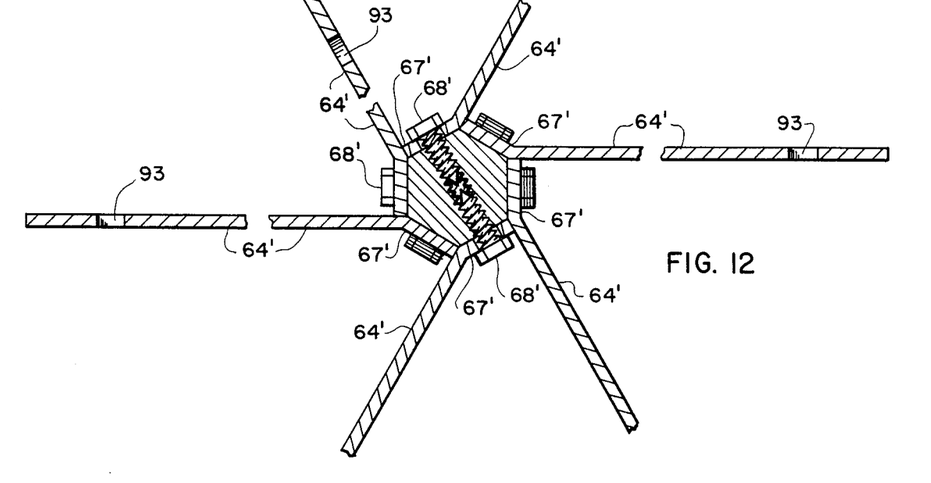
FIG. 12 is a condensed cross section of the air lock rotor of FIG. 10, taken at the position of line 12—12 of FIG. 11.

In further accordance with this invention, the blades 64' of the rotor R', shown in FIG. 12, are individually attached to the hexagonal shaft 35' of FIG. 11 by drilling three series of spaced holes 90, 91 and 92, such as three holes each, to extend completely through the shaft, as in FIG. 11, from one hexagonal surface to the opposite. The second series of holes 91 are drilled in an adjacent hexagonal surface to the opposite surface, but spaced laterally in one direction from the holes 90. Also, the third series of holes 92 are drilled from another adjacent surface to the opposite surface and spaced laterally in the opposite direction from holes 90. Each of the holes is then tapped for attachment to the respective hexagonal surfaces of a flange 67' of each blade 64'. Each flange 67' is inclined from the blade at an angle on the order of 30° from the plane of the blade, so that the included angle between a blade 64' and the corresponding flange 67' will be approximately 150°. Each of the blade flanges 67' is provided with a series of holes, such as three, corresponding to the position of the respective tapped hopes 90, 91 and 92 in the shaft. Thus, of the six blade flanges, two will have holes corresponding to the holes 90, two will have holes corresponding to the holes 91 and the remaining two will have holes corresponding to the holes 92. In assembling the blades on the shaft, a series of cap bolts 68' are inserted in the respective holes to attach each flange 67' to the corresponding side of the shaft 35'. As shown in FIG. 12, two of the cap bolts 68' are inserted from opposite sides into a tapped hole 90, for attaching the corresponding opposite blade flanges 67' to the shaft. The threaded portions of the cap bolts 68' conveniently correspond in length to onehalf the length of the holes 90, 91, or 92, so that the two cap bolts 68', after being tightened in the holes, will abut at the center. Each blade flange 67' is in turn attached to the hexagonal portion of shaft 35', until all the blades have been assembled. Each blade 64' is provided with a series of holes, such as holes 93 of FIG. 11, for attaching conventional clamping plates for securing the flexible sealing strips 69' of FIG. 10 to the blades, which is conveniently accomplished prior to the assembly of the blades to the shaft. As will be evident, in the event that it is necessary to replace a seal strip, any blade 64' may be removed through the opening 17' since, as in FIG. 8, the flange 67' uppermost on the shaft is accessible through that opening and particularly the cap bolts 68' of FIG. 12, which may be removed for the removal of the corresponding blade assembly. A new blade assembly may be inserted through the opening 17' and the cap bolts 68' reinserted and tightened. Since the sealing strips 69' are in rubbing contact with the inside surfaces of the airlock, they are more prone to wear out than any other part, but the easy removal and replacement of a blade assembly, without disassembly of the airlock, reduces the down time of the machine for replacement of a blade assembly to a small fraction of the time required to remove an airlock and disassemble it. Blade assemblies similar to those previously described may be utilized for the airlock rotor R, in association with blades 64, of the first embodiment. The angle between the flanges 67' and blades 64' of the blade assembly of the second embodiment, as well as similar blade assemblies of the first embodiment, are sufficiently large to permit ready access to the cap bolts 68' of FIGS. 8 and 11 and corresponding cap bolts of the first embodiment. Thus, the included angle of approximately 150° is preferred, although variation in this angle is possible. Thus, the angle between a blade and its flange should be 90° or greater, i.e. an obtuse angle. It will be noted that it appears to be immaterial whether the direction of rotation of the airlock rotor is in one direction or the other, i.e. whether the blade 64 or 64' is leading or trailing with respect to the corresponding flange 67 or 67'.

As indicated previously, features of the second embodiment may be utilized in the first embodiment, as well as vice-versa. In addition, although two preferred embodiments of this invention have been illustrated and described, it will be understood that other embodiments may exist and that other changes be made, without departing from the spirt and scope of this invention.

What is claimed is:

1. In an airlock having a housing for receiving insulation through an upper inlet for insulation and a rotor within said housing including a series of circumferential spaced vanes providing a series of spaces for moving insulation from said upper inlet to a lower position, generally sealed from said inlet and at which air is introduced into successive spaces for moving said insulation through an outlet generally opposed to said air inlet, the improvement comprising:
    a shaft having a number of sides corresponding to the number of vanes;
    each said vane including a blade having a flange extending at an obtuse angle to the remainder of said blade;
    means for removably attaching a flange of each said blade to a side of said shaft; and
    each said vane being removable through said upper inlet after detachment from said shaft.

2. In an airlock, as defined in claim 1, wherein:
    said blades and the number of sides of said shaft are even in number; and
    said blade flanges are attached by fastening devices extending into holes through said shaft from one side to the opposite side, with holes extending through different sides of said shaft being longitudinally spaced.

3. In an airlock as defined in claim 1, wherein:
    said blade flanges are attached to the sides of said shaft by removable threaded members engaging tapped holes extending through said shaft between opposite sides, with more than one tapped hole in each side of said shaft and the holes extending through adjacent sides of said shaft being longitudinally spaced.

4. In an airlock, as defined in claim 3, wherein:
    said shaft is hexagonal;
    said blades are six in number; and
    the angle between each said flange and the corresponding blade is approximately 150°.

5. A transportable insulation blower comprising:
    a generally cylindrical hopper having a generally vertical axis;
    a partition providing a circular bottom for said hopper;

an enclosure wall beneath said partition formed essentially as an extension of said hopper;
an agitator in said hopper comprising a series of blades extending radially from an upright shaft which extends upwardly through said partition;
a hopper outlet opening in said partition;
insulation receiving and moving means within said enclosure wall, having a horizontal drive shaft and positioned beneath said partition for receiving insulation passing through said opening and moving said insulation into a discharge conduit extending through said enclosure wall, said receiving and moving means having an air inlet opposite said discharge conduit and said inlet and conduit being laterally offset from a vertical plane through the center of said drive shaft;
means within said enclosure wall for supplying air to said air inlet of said insulation receiving and moving means;
means within said enclosure wall for driving said air supplying means;
means substantially within said enclosure wall for driving one of said agitator shaft and said shaft of said insulation receiving and moving means; and
means within said enclosure for driving the other of said agitator shaft and said shaft of said insulation receiving and moving means from the shaft driven by said driving means.

6. An insulation blower, as defined in claim 5, wherein:
said insulation receiving and moving means comprises an airlock having a series of vanes within a housing and mounted on said generally horizontal shaft to form spaces for receiving insulation from said hopper outlet opening and carrying the same to a lower position for movement into said discharge conduit by air pressure from an inlet generally opposite said discharge conduit; and
means for moving said vanes in a direction past said inlet opening opposite the direction of said agitator blades.

7. An insulation blower, as defined in claim 5, including:
a slide gate disposed above said opening and below said agitator blades, for regulating the flow of insulation through said outlet opening.

8. An insulation blower, as defined in claim 5, wherein:
said partition is inclined outwardly and downwardly from the position of said agitator shaft; and
said agitator blades are inclined outwardly and downwardly from said agitator shaft.

9. An insulation blower as defined in claim 5, wherein:
said means for driving one of said agitator shaft and said shaft of said insulation receiving and moving means includes an electric motor and speed reducer driving said agitator shaft.

10. An insulation blower as defined in claim 9, including:
intermeshing miter gears on said agitator shaft and said shaft of said receiving and moving means.

11. An insulation blower as defined in claim 5, wherein:
said means for driving one of said agitator shaft and said shaft of said insulation receiving and moving means includes an electric motor and speed reducer having a shaft parallel to said shaft of said receiving and moving means; and
a chain and sprocket drive between said speed reducer shaft and said shaft of said receiving and moving means.

12. An insulation blower as defined in claim 11, including:
intermeshing miter gears on said agitator shaft and said shaft of said receiving and moving means.

13. An insulation blower comprising:
a generally cylindrical, upright hopper;
a partition providing a generally circular bottom for said hopper, said partition having an outlet opening through which insulation may move from said hopper;
agitating means movable about an upright axis in said hopper, including an upright shaft extending upwardly through said partition;
an enclosure formed by a wall beneath said partition and formed essentially as an extension of said hopper, said agitator shaft extending into said enclosure;
an airlock beneath said partition and within said enclosure, said airlock having a housing provided with an upper inlet located to receive insulation moving through said partition opening and having a central, generally horizontal shaft carrying a series of radial vanes within said housing, an air inlet and an outlet extending through said enclosure wall at a position laterally offset from a vertical plane through the center of said airlock shaft for discharge of insulation propelled by such air, said air inlet and corresponding outlet being at opposed ends of the lower portion of said airlock housing and the axis of said horizontal airlock shaft extending to generally intersect the axis of said agitator shaft;
electric drive means substantially within said enclosure for rotating one of said agitator shaft and said airlock shaft;
means for rotating the other said agitator shaft and airlock shaft from the shaft rotated by said electric drive means;
an electrically driven blower having an air discharge connection communicating with said air inlet of said airlock, said air inlet and said blower connection being laterally offset from said vertical plane through the center of said airlock shaft to clear said agitator shaft; and said means for rotating, said blower and said blower connection being contained substantially within said enclosure.

14. An insulation blower, as defined in claim 13, wherein:
said airlock shaft is driven by said drive means; and
said agitator shaft extends to a bearing below said airlock shaft.

15. An insulation blower as defined in claim 13, wherein:
said drive means is connected to said agitator shaft below said airlock shaft.

16. An insulation blower comprising:
a generally cylindrical, upright hopper;
a partition providing a generally circular bottom for said hopper, said partition having an outlet opening through which insulation may move from said hopper;

agitating means movable about an upright axis in said hopper, including an upright shaft extending upwardly through said partition;

an airlock beneath said partition, having a housing provided with an upper inlet located to receive insulation moving through said partition opening and having a generally horizontal shaft carrying a series of radial vanes within said housing, an air inlet and an outlet for discharge of insulation propelled by such air, said inlet and corresponding outlet being at opposed ends of the lower portion of said airlock housing;

said airlock shaft having a number of sides corresponding to the number of vanes;

each said vane including a blade having a flange extending at an obtuse angle to the remainder of said blade;

means for removably attaching a flange of each said blade to a side of said shaft;

each said vane being removable, after detachment from said shaft, through said upper inlet of said airlock and said outlet opening of said partition; and means for rotating said agitator shaft and said airlock shaft.

17. An insulation blower as defined in claim 16, including:

an enclosure wall beneath said partition formed essentially as an extension of said hopper;

said means for rotating said agitator shaft and airlock shaft comprising electric means substantially within said enclosure wall for driving one of said agitator shaft and said airlock shaft; and means for driving the other of said agitator shaft and said airlock shaft from the shaft driven by said electric means.

18. An insulation blower as defined in claim 16, including:

an electrically driven blower having an air discharge connection with said air inlet of said airlock; and said inlet and outlet of said airlock being laterally offset from a vertical plane through the center line of said airlock shaft.

19. An insulation blower as defined in claim 18, including:

electric means substantially within said enclosure wall for driving one of said agitator shaft and said airlock shaft; and means for driving the other of said agitator shaft and airlock shaft from the shaft driven by said electric means.

* * * * *